(12) United States Patent
Yoshii et al.

(10) Patent No.: US 9,344,711 B2
(45) Date of Patent: May 17, 2016

(54) IMAGE DISPLAY APPARATUS AND SHUTTER DEVICE

(71) Applicant: Seiko Epson Corporation, Tokyo (JP)

(72) Inventors: Ryo Yoshii, Matsumoto (JP); Satoshi Nakai, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 459 days.

(21) Appl. No.: 13/890,037

(22) Filed: May 8, 2013

(65) Prior Publication Data

US 2013/0300844 A1      Nov. 14, 2013

(30) Foreign Application Priority Data

May 9, 2012    (JP) .................................. 2012-107828

(51) Int. Cl.
*H04N 13/04* (2006.01)
(52) U.S. Cl.
CPC ....... *H04N 13/0438* (2013.01); *H04N 13/0497* (2013.01); *H04N 2013/0461* (2013.01)
(58) Field of Classification Search
CPC .................................................. H04N 13/0438
See application file for complete search history.

(56) References Cited

U.S. PATENT DOCUMENTS

| | | |
|---|---|---|
| 2010/0231697 A1 | 9/2010 | Nakahata et al. |
| 2011/0141248 A1 | 6/2011 | Watabu et al. |
| 2011/0142426 A1 | 6/2011 | Sasaki et al. |
| 2011/0149053 A1 | 6/2011 | Ito et al. |
| 2011/0267442 A1* | 11/2011 | Imai et al. ....................... 348/56 |

FOREIGN PATENT DOCUMENTS

| | | | |
|---|---|---|---|
| JP | 2010-217310 | A | 9/2010 |
| JP | 2011-003392 | A | 1/2011 |
| JP | 2011-128548 | A | 6/2011 |
| JP | 2011-130468 | A | 6/2011 |
| JP | 2011-142606 | A | 7/2011 |
| JP | 2011142606 | A * | 7/2011 |
| WO | 2010-084849 | A1 | 7/2010 |

* cited by examiner

*Primary Examiner* — Jefferey Harold
*Assistant Examiner* — Humam Satti
(74) *Attorney, Agent, or Firm* — Maschoff Brennan

(57) ABSTRACT

An image display apparatus includes an image display unit that displays an image for a stereoscopic image, a light-source control unit that controls a light source of the image display unit, a content discriminating unit that discriminates whether the image displayed on the image display unit is a limited image requiring viewing limitation or an unlimited image not requiring the viewing limitation, and a shutter control unit that controls shutter of shutter devices. The light-source control unit controls the light source to reduce light emission in a second period compared with light emission in a first period. The shutter control unit controls, during the display of the limited image, the shutter device set in a viewing limitation mode for limiting viewing of the limited image, to close the shutter in the first period and open the shutter in the second period.

14 Claims, 9 Drawing Sheets

| GLASSES IDENTIFICATION INFORMATION | VIEWING LIMITATION MODE SETTING PRESENCE OR ABSENCE INFORMATION |
|---|---|
| G001 | 0 (SETTING OFF) |
| G002 | 1 (SETTING ON) |

IMAGE DISPLAY APPARATUS AND SHUTTER DEVICE

The entire disclosure of Japanese Patent Application No. 2012-107828, filed May 9, 2012 is expressly incorporated by reference herein.

BACKGROUND

1. Technical Field

The present invention relates to an image display apparatus and a shutter device.

2. Related Art

There has been known a 3D reproduction apparatus that can set a parental level (see, for example, JP-A-2011-130468 (Patent Literature 1). The 3D reproduction apparatus described in Patent Literature 1 realizes parental control such as reproduction (2D reproduction/3D reproduction) of content or stop of the content according to an age of a viewer. For example, the 3D reproduction apparatus described in Patent Literature 1 can allow children younger than a fixed age to see a 3D video only as a 2D video.

However, according to the technique described in JP-A-2011-130468, although permission/prohibition of reproduction content or 2D reproduction/3D reproduction of the content can be switched according to an age, when an adult meeting an age requirement views the content together with a child not meeting the age requirement, even the adult is obliged to comply with viewing limitation (the reproduction prohibition or the 2D reproduction). That is, the parental control (also referred to as parental limitation) of the 3D reproduction apparatus described in Patent Literature 1 is not so convenient as to allow the adult and the child to simultaneously enjoy the content.

SUMMARY

An advantage of some aspect of the invention is to provide a technique for realizing convenient parental control for allowing an adult and a child to simultaneously enjoy content.

An aspect of the invention is directed to an image display apparatus that displays an image for a stereoscopic image to be viewed using a shutter device including shutters for the right eye and the left eye. The image display apparatus includes: an image display unit configured to display the image; a light-source control unit configured to control a light source of the image display unit in a first period and a second period; a content discriminating unit configured to discriminate whether the image displayed on the image display unit is a limited image requiring viewing limitation or an unlimited image not requiring the viewing limitation; and a shutter control unit configured to control the shutter of the shutter device. The light-source control unit controls the light source to reduce light emission in the second period compared with light emission in the first period. The shutter control unit controls, during the display of the limited image, the shutter device set in a viewing limitation mode for limiting viewing of the limited image, to close the shutter in the first period and open the shutter in the second period.

With the configuration, it is possible to realize convenient parental control for allowing an adult and a child to simultaneously enjoy content. Specifically, as a preparatory stage, the viewing limitation mode of the shutter device used by the child is set to ON and the viewing limitation mode of the shutter device used by the adult is set to OFF. The image display apparatus transmits, during the display of the limited image, control information to the shutter device for the child, the viewing limitation mode of which is set to ON, to close the shutter device in the first period (a lighting period of the light source (e.g., a backlight) or a period in which the light source is intense (in other words, light emission intensity of the light source is high)) and open the shutter device in the second period (an extinguished period of the light source or a period in which the light source is faint (in other words, light emission intensity of the light source is low)). Therefore, it is difficult for the child wearing the shutter device for the child to view the displayed limited image (entire content/scenes in the content). When the child removes the shutter device, viewing is made difficult by crosstalk.

In the image display apparatus, the shutter control unit may control, during the display of the limited image and during the display of the unlimited image, the shutter device not set in the viewing limitation mode, to open the shutter in the first period and close the shutter in the second period.

With the configuration, the image display apparatus transmits, both during the display of the unlimited image and during the display of the limited image, the control information to the shutter device, the viewing limitation mode of which is set to OFF, to open the shutter device in the first period and close the shutter device in the second period. Therefore, if the viewing limitation mode of the shutter device used by the adult is set to OFF, the adult can properly view even the limited image.

In the image display apparatus, the shutter control unit may control, during the display of the unlimited image, the shutter device not set in the viewing limitation mode and the shutter device set in the viewing limitation mode, to open the shutter in the first period and close the shutter in the second period.

With the configuration, the image display apparatus transmits, during the display of the unlimited image, the control information to both of the shutter device, the viewing limitation mode of which is set to OFF, and the shutter device, the viewing limitation mode of which is set to ON, to open the shutter devices in the first period and close the shutter devices in the second period. Therefore, even if the viewing limitation mode of the shutter device used by the child is set to ON, the child can properly view the unlimited image.

In the image display apparatus, the shutter control unit may control, during the display of the limited image, the shutter to open in time including the center of the second period.

With the configuration, since the image display apparatus opens the shutter in a darkest period of time, it is possible to make it more difficult for the child to view the limited image.

In the image display apparatus, the shutter control unit may sets, during the display of the limited image, the center of a period of opening of the shutter during non-setting of the viewing limitation mode in the center of a period of closing of the shutter during setting of the viewing limitation mode, and sets the center of a period of closing of the shutter during the non-setting of the viewing limitation mode in the center of a period of opening of the shutter during the setting of the viewing limitation mode.

With the configuration, the image display apparatus opens and closes the shutter completely oppositely in normal time (when viewing is not made difficult) and in viewing limitation time (when viewing is made difficult), i.e., opens the shutter in a darkest period of time while maintaining the centers of the periods of opening and closing. Therefore, it is possible to make it more difficult for the child to view the limited image.

In the image display apparatus, the shutter control unit may sets, during the display of the limited image, time of opening during setting of the viewing limitation mode to be shorter than time of opening during non-setting of the viewing limitation mode.

With the configuration, the image display apparatus sets the time of opening during the viewing limitation short compared with the normal time. Therefore, it is possible to make it more difficult for the child to view the limited image.

In the image display apparatus, the shutter control unit may sets, during the display of the limited image, time of opening of during setting of the viewing limitation mode to be shorter than time of closing during the setting of the viewing limitation mode.

With the configuration, the image display apparatus sets the time of opening short compared with the time of closing during the viewing limitation. Therefore, it is possible to make it more difficult for the child to view the limited image.

In the image display apparatus, the shutter control unit may set, during the display of the limited image, the center of time of opening during setting of the viewing limitation mode before the center of the second period and control, during non-setting of the viewing limitation mode, in the second period, the shutter for the right eye or the left eye different from the shutter for the right eye or the left eye opened in the first period immediately before the second period to open.

With the configuration, during the viewing limitation, even if an image is seen because of deviation of light source (e.g., backlight) control, afterglow of the light source, or the like, the image display apparatus allows images (an image seen via the shutter for the right eye is an image for the left eye and an image seen via the shutter for the left eye is an image for the right eye) opposite to images that should be originally seen via the shutter (an image that should be seen via the shutter for the right eye is a image for the right eye and an image that should be seen via the shutter for the left eye is an image for the left eye) to be seen. Therefore, even when the deviation of the light source control, the afterglow of the light source, or the like occurs, it is possible to surely make it difficult for the child to view the limited image.

In the image display apparatus, the shutter control unit may set, during the display of the limited image, the center of time of opening during setting of the viewing limitation mode after the center of the second period and, during non-setting of the viewing limitation mode, control, in the second period, one of the shutters for the right eye and the left eye opened in the first period immediately before the second period to open.

With the configuration, even when deviation of light source control, afterglow of the light source, or the like occurs, it is possible to surely make it difficult for the child to view the limited image as in the control of the shutter explained above (the control for, during the display of the limited image, opening and closing of the shutter to set the center of time of opening during setting of the viewing limitation mode before the center of the second period and open, during non-setting of the viewing limitation mode, in the second period, the shutter for the right eye or the left eye different from the shutter for the right eye or the left eye opened in the first period immediately before the second period).

In the image display apparatus, the image display unit may display an image indicating that the limited image is displayed.

With the configuration, for example, when the adult and the child view the limited image together, it is possible to inform the adult that the limited image is properly not seen for the child. Consequently, it is possible to appropriately cope with a complaint of the child that, for example, it is hard to see an image.

In the image display apparatus, the shutter control unit may control, when a continuous display time of the limited image exceeds a predetermined time, the shutter device set in the viewing limitation mode to close in the second period.

With the configuration, the image display apparatus makes even an image shown by opening the shutter in the second period (an image hard to view) completely unseen. Therefore, it is possible to eliminate a burden on the eyes caused when the image hard to view is seen for a long time.

In the image display apparatus, the image display unit may display an image indicating that the continuous display time of the limited image exceeds a predetermined time.

With the configuration, for example, when the adult and the child view the limited image together, it is possible to inform the adult that the child is viewing a pitch black screen. Consequently, for example, it is possible to instruct the child to remove the shutter device.

In the image display apparatus, the shutter control unit may control, during the display of the limited image, when emergency information is displayed, the shutter device to open the shutter, in the first period, even the shutter device set in the viewing limitation mode, and control the shutter device to close the shutter in the second period.

With the configuration, the image display apparatus releases the viewing limitation when the emergency information (e.g., earthquake early warning or tsunami warning) is displayed. Therefore, it is possible to allow even the child to view the emergency information during the display of the limited image.

In the image display apparatus, the shutter devices may include a first shutter device and a second shutter device. Setting of the viewing limitation mode of the second shutter device may be performed by the first shutter device.

With the configuration, it is possible to prevent the child from changing the viewing limitation mode and viewing the limited image as he or she likes.

Another aspect of the invention is directed to a shutter device for viewing a stereoscopic image displayed by an image display apparatus. The shutter device includes: a shutter unit including shutters for the right eye and the left eye; a receiving unit configured to receive a synchronization signal for controlling driving timing of the shutter unit and receive, when the image is a limited image requiring viewing limitation, a discrimination result indicating that the image is the limited image; and a shutter control unit configured to control the shutter unit. During setting of a viewing limitation mode for limiting viewing of the limited image, when the receiving unit receives the discrimination result indicating that the image is the limited image, the shutter control unit adjusts the synchronization signal received by the receiving unit and controls the shutter to make it difficult to see the image.

With the configuration, even if the image display apparatus does not output a different control signal (synchronization signal) for each shutter device in order to adjust the synchronization signal according to necessity, it is possible to realize convenient parental control for allowing an adult and a child to simultaneously enjoy content.

In the shutter device, the shutter control unit may set the center of a period of opening of the shutter indicated by the synchronization signal in the center of a period of closing of the shutter after the adjustment and set the center of a period of closing of the shutter indicated by the synchronization signal in the center of a period of opening of the shutter after the adjustment.

With the configuration, the shutter device opens and closes the shutter completely oppositely in normal time (when viewing is not made difficult) and in viewing limitation time (when viewing is made difficult), i.e., opens the shutter in a darkest period of time while maintaining the centers of the periods of opening and closing. Therefore, it is possible to make it more difficult for the child to view the limited image.

In the shutter device, the shutter control unit may sets time of opening of the shutter after the adjustment to be shorter than time of opening of the shutter indicated by the synchronization signal.

With the configuration, the shutter device sets the time of opening during the viewing limitation short compared with the normal time. Therefore, it is possible to make it more difficult for the child to view the limited image.

The shutter device may include a setting unit configured to set the shutter device in the viewing limitation mode. The setting unit may set each of other singularity or plurality of the shutter devices not including the setting unit in the viewing limitation mode.

With the configuration, it is possible to prevent the child from changing the viewing limitation mode and viewing the limited image as he or she likes.

BRIEF DESCRIPTION OF THE DRAWINGS

The invention will be described with reference to the accompanying drawings, wherein like numbers reference like elements.

DESCRIPTION OF EXEMPLARY EMBODIMENTS

First Embodiment

Figure 1:
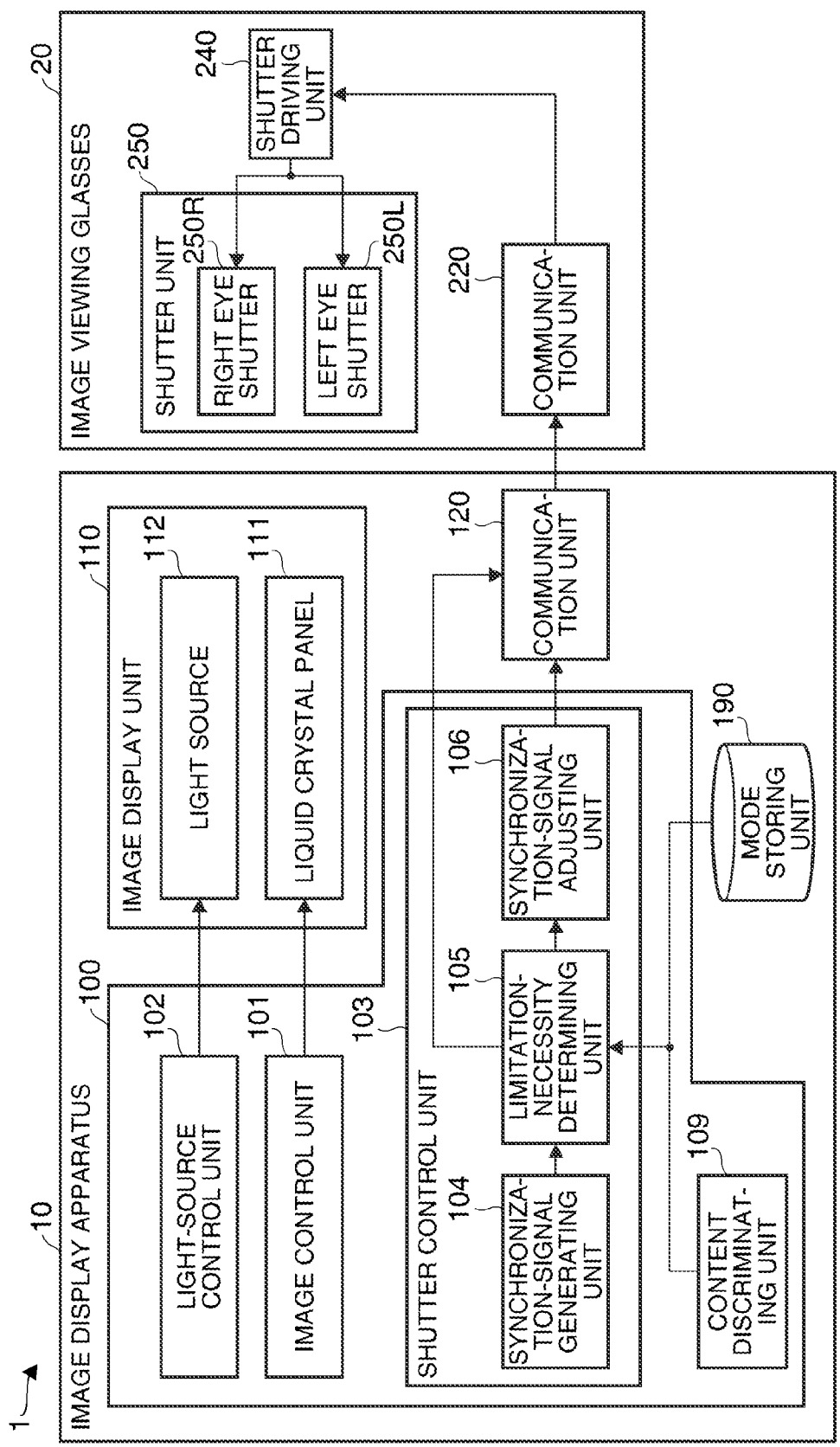
FIG. 1 is an example of a functional block diagram of an image display system including an image display apparatus according to a first embodiment of the invention.
Figures 2, 3:
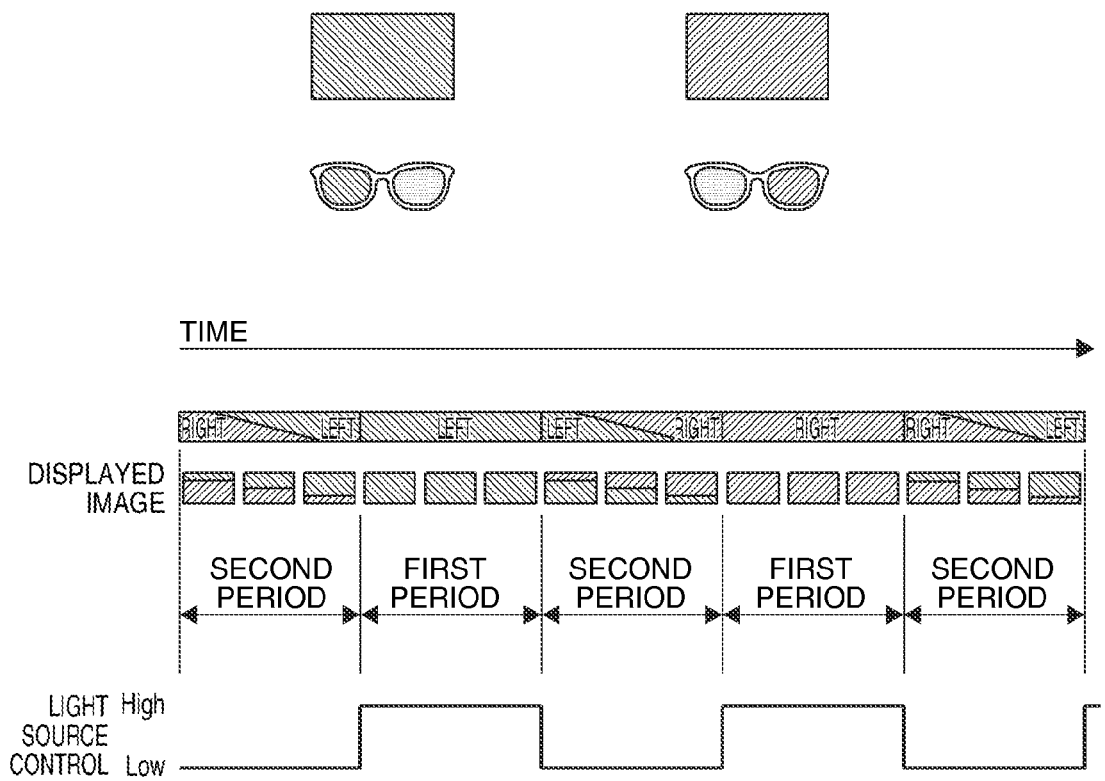
FIG. 2 is an explanatory diagram for explaining control by a light-source control unit.
FIG. 3 is an example of information stored in a mode storing unit.
Figure 4:
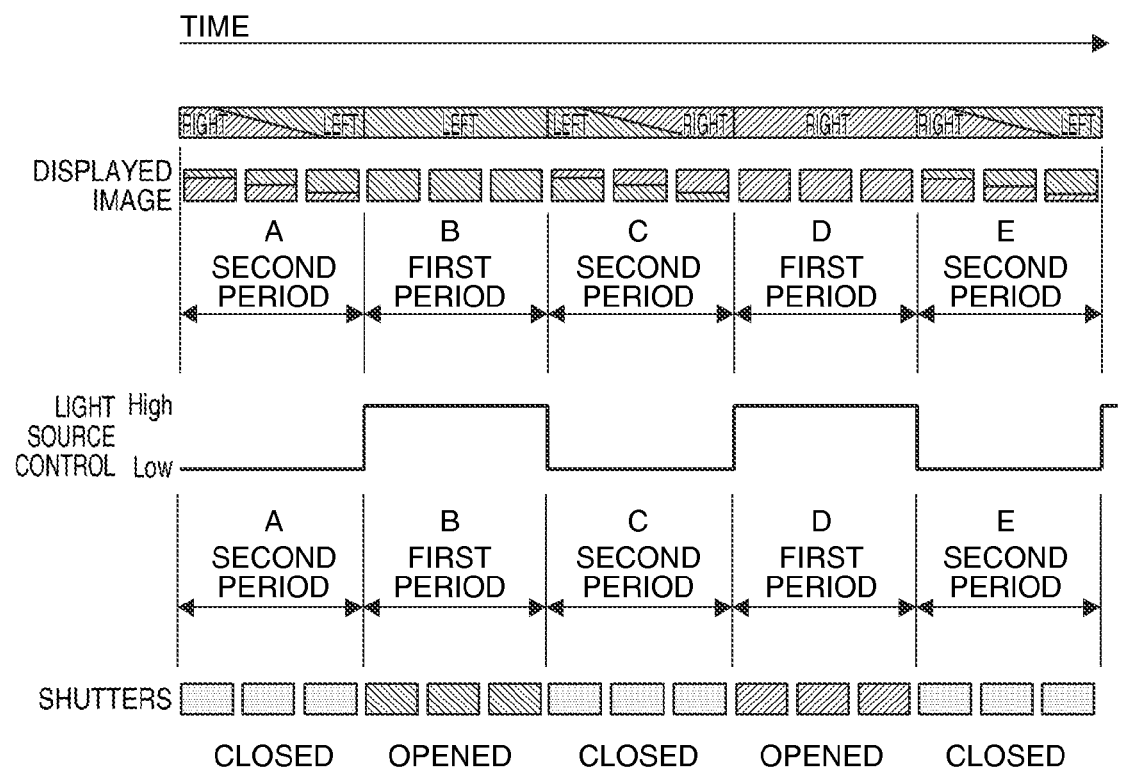
FIG. 4 is an explanatory diagram for explaining a synchronization signal generated by a synchronization-signal generating unit.

A first embodiment of the invention is explained in detail below with reference to the drawings. FIG. 1 is an example of a functional block diagram of an image display system 1 including an image display apparatus 10 according to the first embodiment of the invention. FIG. 2 is an explanatory diagram for explaining control by a light-source control unit 102. FIG. 3 is an example of information stored in a mode storing unit 190. FIG. 4 is an explanatory diagram for explaining a synchronization signal generated by a synchronization-signal generating unit 104. FIGS. 5A and 5B and 6A to 6D are explanatory diagrams for explaining the synchronization signal adjusted by a synchronization-signal adjusting unit 106.

The image display system 1 includes, as shown in FIG. 1, an image display apparatus 10 configured to display an image for 3D content (also referred to as 3D image or stereoscopic image) including an image for the left eye and an image for the right eye and image viewing glasses (also referred to as 3D glasses or a shutter device) for viewing the 3D content displayed by the image display apparatus 10. For example, a 3D television or a projector corresponds to the image display apparatus 10. One pair of image viewing glasses 20 is shown in FIG. 1. However, the image display system 1 may include a plurality of pairs of image viewing glasses 20.

Image Display Apparatus 10

The image display apparatus 10 includes a control unit 100 (a CPU), an image display unit 110, a communication unit 120, and a mode storing unit 190. The control unit 100 includes an image control unit 101, a light-source control unit 102, a shutter control unit 103, and a content discriminating unit 109. The shutter control unit 103 includes a synchronization-signal generating unit 104, a limitation-necessity determining unit 105, and a synchronization-signal adjusting unit 106. The image display unit 110 includes a liquid crystal panel 111 and alight source 112.

The image control unit 101 acquires 3D content and display timing (a display timing signal) for the 3D content. For example, when the image display apparatus 10 includes an antenna unit (not shown in the figure), the image control unit 101 acquires (receives) the 3D content and the display timing from a broadcasting station (a broadcast wave) via the antenna unit. The image control unit 101 may acquire the 3D content and the display timing from an external apparatus (e.g., a personal computer or a server). When the image display apparatus 10 includes a content storing unit (not shown in the figure), the image control unit 101 may acquire the 3D content and the display timing from the content storing unit.

When acquiring the 3D content and the display timing for the 3D content, the image control unit 101 outputs the 3D content to the liquid crystal panel 111 at the display timing. More specifically, the image control unit 101 executes necessary processing (scaling, keystone, frame rate conversion, etc.) on the acquired 3D content and outputs the 3D content to the liquid crystal panel 111 at the acquired display timing. The display control unit 101 outputs the display timing to the light-source control unit 102 and the shutter control unit 103 (the synchronization-signal generating unit 104).

The liquid crystal panel 111 displays the 3D content supplied from the image control unit 101. The brightness (the luminance) of the liquid crystal panel 111 is adjusted by transmitted light of the light source 112. Therefore, the displayed 3D content brightens if a light emission level of the light source 112 is increased. The displayed 3D content darkens if the light emission level of the light source 112 is reduced.

The light-source control unit 102 acquires the display timing from the image control unit 101. When acquiring the display timing from the image control unit 101, the light-source control unit 102 controls the light source 112 according to the display timing. Specifically, as shown in FIG. 2, the light-source control unit 102 controls the light source 112 to reduce light emission in a switching period from the image for the left eye to the image for the right eye or a switching period from the image for the right eye to the image for the left eye (a second period) compared with light emission in a period in which only the image for the left eye is displayed or a period in which only the image for the right eye is displayed (a first period). This makes it difficult to see switching from the image for the left eye to the image for the right eye (or switching from the image for the right eye to the image for the left eye).

The content discriminating unit 109 discriminates whether the 3D content supplied from the image control unit 101 to the liquid crystal panel 111 (i.e., the 3D content displayed on the image display unit 110) is content requiring viewing limitation (parental control) (also referred to as "limited content" or "limited image") or content not requiring the viewing limitation (also referred to as "unlimited content" or "unlimited image"). For example, the content discriminating unit 109 discriminates the limited content and the unlimited content referring to existing information (e.g., information concerning the viewing limitation for the 3D content stored in the 3D content or external information concerning the viewing limitation for the 3D content). The content discriminating unit 109 discriminates the limited content and the unlimited content for the 3D content as a whole or discriminates the limited content and the unlimited content for each reproducing position of the 3D content. The content discriminating unit 109 outputs a discrimination result to the limitation-necessity determining unit 105.

The mode storing unit 190 stores a mode set in the image viewing glasses 20. Specifically, the mode storing unit 190 stores, concerning the respective pairs of image viewing glasses 20, information indicating presence or absence of setting of a viewing limitation mode for limiting viewing of the limited content (hereinafter referred to as "viewing limitation mode setting presence or absence information"). For example, as shown in FIG. 3, the mode storing unit 190 stores the viewing limitation mode setting presence or absence information in association with glasses identification information for identifying the image viewing glasses 20. In an example shown in FIG. 3, the image viewing glasses 20 having glasses identification information "G001" are not set in the viewing limitation mode (viewing limitation mode setting presence or absence information "0 (setting off)"). The image viewing glasses 20 having glasses identification information "G002" are already set in the viewing limitation mode (viewing limitation mode setting presence or absence information "1 (setting on)"). An initial value of the viewing limitation mode setting presence or absence information may be set to 0.

The viewing limitation mode setting presence or absence information of the respective pairs of image viewing glasses 20 stored in the mode storing unit 190 may be received via an operation receiving unit (not shown in the figure) of the image display apparatus 10. That is, a user may input, on the image display apparatus 10, the viewing limitation mode setting presence or absence information of the respective pairs of image viewing glasses 20. The viewing limitation mode setting presence or absence information of the respective pairs of image viewing glasses 20 stored in the mode storing unit 190 may be input in the respective pairs of image viewing glasses 20 and transmitted from the respective pairs of image viewing glasses 20 (using Bluetooth). That is, the user may input the viewing limitation mode setting presence or absence information of the respective pairs of image viewing glasses 20 on the respective pairs of image viewing glasses 20.

In the image viewing glasses 20, master glasses (also referred to as master 3D glasses or a first shutter device) and slave glasses (also referred to as slave 3D glasses or a second shutter device) may be present. The viewing limitation mode setting presence or absence information of the slave glasses may be input in the master glasses and transmitted from the master glasses (using Bluetooth). The viewing limitation mode setting presence or absence information of the slave glasses may be realized by permitting an input of the viewing limitation mode setting presence or absence information in the master glasses and prohibiting an input of the viewing limitation mode setting presence or absence information in the slave glasses or may be realized by, in the image display apparatus 10, storing the viewing limitation mode setting presence or absence information transmitted from the master glasses in the mode storing unit 190 and discarding the viewing limitation mode setting presence or absence information transmitted from the slave glasses.

The shutter control unit 103 controls, with a control signal (explained below), at least one of shutters (explained below) included in the image viewing glasses 20. Details of the shutter control unit 103 are explained below.

The synchronization-signal generating unit 104 acquires the display timing from the image control unit 101. The synchronization-signal generating unit 104 generates, according to the display timing acquired from the image control unit 101, a synchronization signal transmitted to the image viewing glasses 20.

Specifically, the synchronization-signal generating unit 104 generates a synchronization signal for opening the shutters included in the image viewing glasses 20 in the first period and closing the shutters in the second period as shown in FIG. 4. "Opening" does not need to completely "open" the shutters and "closing" does not need to completely "close" the shutters. In "closing", the transmittance of light only has to be lower than that in "opening".

FIG. 4 is an example in which a left eye shutter (explained below) opens in a first period (B) following a second period (A) in which the image for the right eye is switched to the image for the left eye and a right eye shutter (explained below) opens in a first period (D) following a second period (C) in which the image for the left eye is switched to the image for the right eye.

The limitation necessity determining unit 105 acquires the synchronization signal from the synchronization-signal generating unit 104 and acquires the discrimination result from the content discriminating unit 109. When acquiring the synchronization signal and the discrimination result, the limitation necessity determining unit 105 determines, on the basis of the acquired discrimination result and the viewing limitation mode setting presence or absence information stored in the mode storing unit 190, necessity of viewing limitation in the respective image viewing glasses 20 against the 3D content supplied from the image control unit 101 to the liquid crystal panel 111 (i.e., the 3D content displayed on the image display unit 110).

Specifically, when the limitation-necessity determining unit 105 acquires the discrimination result indicating that the 3D content displayed on the image display unit 110 is the limited content and certain image viewing glasses 20 are already set in the viewing limitation mode, the limitation-necessity determining unit 105 determines that the viewing limitation in the image viewing glasses 20 against the 3D content is necessary. That is, the limitation-necessity determining unit 105 determines that, during the display of the limited content, the viewing limitation in the image viewing glasses 20 already set in the viewing limitation mode is necessary.

When the limitation-necessity determining unit 105 acquires the discrimination result indicating that the 3D content displayed on the image display unit 110 is the limited content or the unlimited content and certain image viewing glasses 20 are not set in the viewing limitation mode, the limitation-necessity determining unit 105 determines that the viewing limitation in the image viewing glasses 20 against the 3D content is unnecessary. That is, the limitation-necessity determining unit 105 determines that the viewing limitation in the image viewing glasses 20 not set in the viewing limitation mode is unnecessary during the display of the limited content and during the display of the unlimited content. In other words, in the case of the image viewing glasses 20 not set in the viewing limitation mode, the limitation-necessity determining unit 105 determines that the viewing limitation is unnecessary irrespective of the limited content and the unlimited content.

When the limitation-necessity determining unit 105 acquires the discrimination result indicating that the 3D content displayed on the image display unit 110 is the unlimited content and certain image viewing glasses 20 are not set in or already set in the viewing limitation mode, the limitation-necessity determining unit 105 determines that the viewing limitation in the image viewing glasses 20 against the 3D glasses is unnecessary. That is, the limitation-necessity determining unit 105 determines that the viewing limitation in the image viewing glasses 20 not set in the viewing limitation mode and the image viewing glasses 20 already set in the viewing limitation mode is unnecessary during the display of the unlimited content. In other words, when the unlimited content is being displayed, the limitation-necessity determining unit 105 determines that the viewing limitation is unnecessary irrespective of whether the viewing limitation mode is not set or is already set.

When determining that the viewing limitation is unnecessary, the limitation-necessity determining unit 105 outputs the synchronization signal acquired from the synchronization-signal generating unit 104 to the communication unit 120. When determining that the viewing limitation is necessary, the limitation-necessity determining unit 105 outputs the synchronization signal acquired from the synchronization-signal generating unit 104 to the synchronization-signal adjusting unit 106.

When the limitation-necessity determining unit 105 determines that the viewing limitation is necessary, the synchronization-signal adjusting unit 106 acquires the synchronization signal from the limitation-necessity determining unit 105. When acquiring the synchronization signal from the limitation-necessity determining unit 105, the synchronization-signal adjusting unit 106 adjusts (corrects) the synchronization signal.

The adjusting (correcting) the synchronization signal only has to be adjusting an original signal as a result. For example, the adjusting (correcting) may be simply correcting the original signal (including simply correcting timing) or may be generating a new signal using the original signal.

Figure 5A:
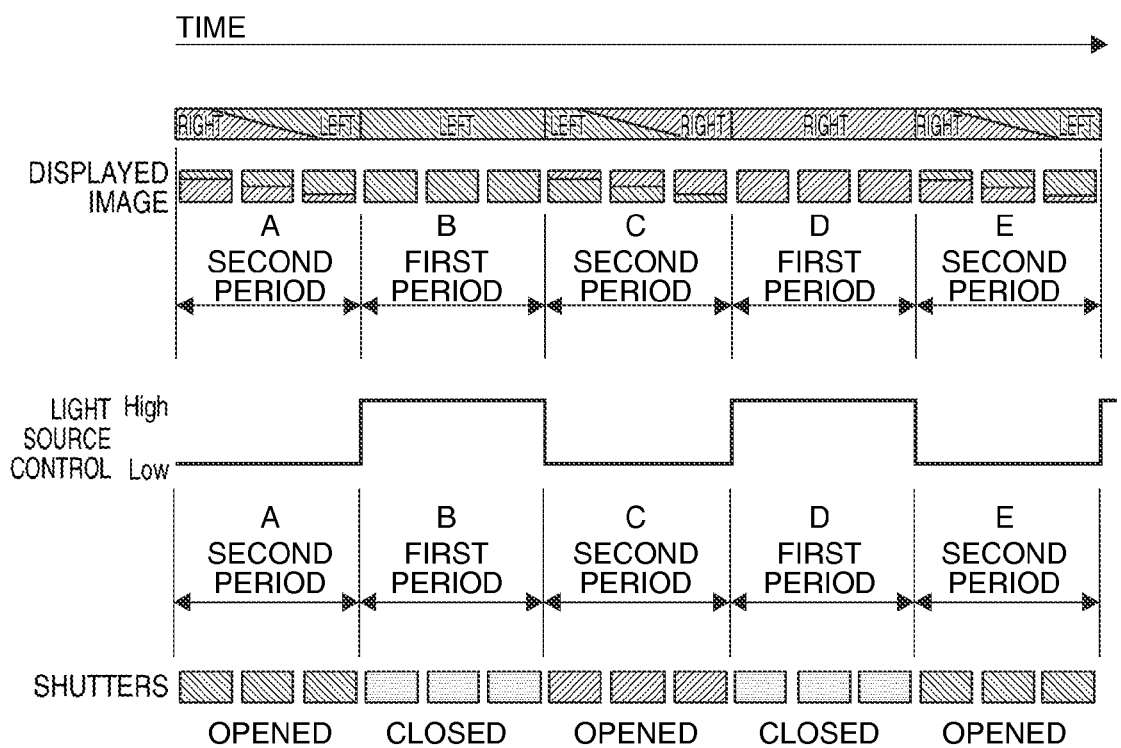
FIGS. 5A and 5B are explanatory diagrams for explaining the synchronization signal adjusted by a synchronization-signal adjusting unit.
Figure 5B:
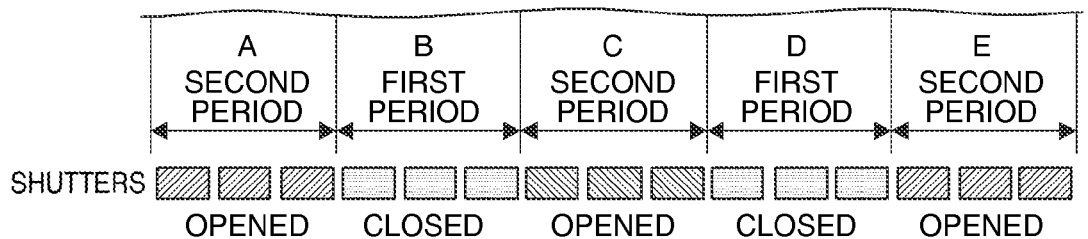

Specifically, the synchronization-signal adjusting unit 106 adjusts the synchronization signal to close the shutters included in the image viewing glasses 20 in the first period and open the shutters in the second period as shown in FIG. 5A. FIG. 5A is an example in which the left eye shutter opens in the second periods (A and E) in which the image for the right eye is switched to the image for the left eye and the right eye shutter opens in the second period (C) in which the image for the left eye is switched to the image for the right eye. However, the synchronization-signal adjusting unit 106 may adjust the synchronization signal to open the right eye shutter in the second periods (A and E) and open the left eye shutter in the second period (c) as shown in FIG. 5B. The synchronization-signal adjusting unit 106 outputs the adjusted synchronization signal to the communication unit 120.

That is, the shutter control unit 103 controls, during the display of the limited content, targeting the image viewing glasses 20 set in the viewing control mode, opening and closing of the right eye shutter and the left eye shutter included in the image viewing glasses 20 to close the shutters in the first period and open the shutters in the second period (see FIGS. 5A and 5B).

The shutter control unit 103 controls, during the display of the limited content and during the display of the unlimited content, targeting the image viewing glasses 20 not set in the viewing limitation mode, opening and closing of the right eye shutter and the left eye shutter included in the image viewing glasses 20 to open the shutters in the first period and close the shutters in the second period (see FIG. 4).

The shutter control unit 103 controls, during the display of the unlimited content, targeting the image viewing glasses 20 not set in the viewing limitation mode and the image viewing glasses 20 set in the viewing limitation mode, opening and closing of the right eye shutter and the left eye shutter included in the image viewing glasses 20 to open the shutters in the first period and close the shutters in the second period (see FIG. 4).

The shutter control unit 103 may control, during the display of the limited content, opening and closing of the right eye shutter and the left eye shutter included in the image viewing glasses 20 to open the shutters in time including the center of the second period. Examples shown in FIGS. 5A and 5B are examples in which the shutters are controlled as explained above.

The shutter control unit 103 may control, during the display of the limited content, opening and closing of the right eye shutter and the left eye shutter included in the image viewing glasses 20 to set the center of a period of opening during non-setting of the viewing limitation mode in the center of a period of closing during setting of the viewing limitation mode and set the center of a period of closing during non-setting of the viewing limitation mode in the center of a period of opening during setting of the viewing limitation mode. Examples shown in FIGS. 5A and 5B are examples in which the shutters are controlled as explained above.

The shutter control unit 103 may control, during the display of the limited content, opening and closing of the right eye shutter and the left eye shutter included in the image viewing glasses 20 to set time of opening during setting of the viewing limitation mode shorter than time of opening during non-setting of the viewing limitation mode as shown in FIG. 6A, 6B, 6C, or 6D.

Figure 6A:
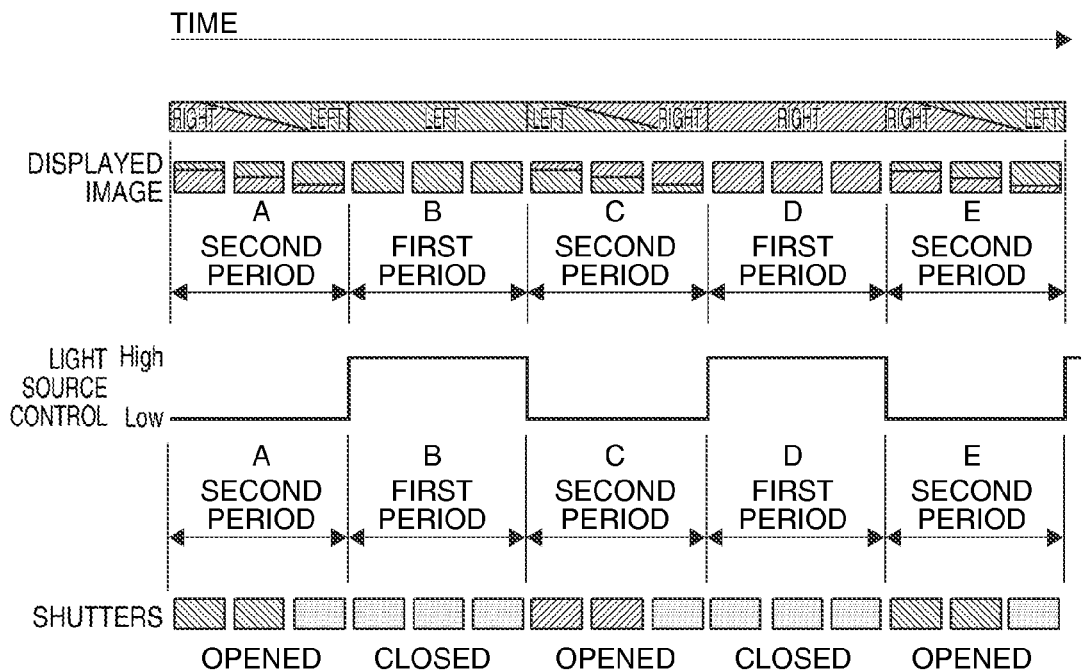
FIGS. 6A to 6D are explanatory diagrams for explaining the synchronization signal adjusted by the synchronization-signal adjusting unit.
Figure 6B:
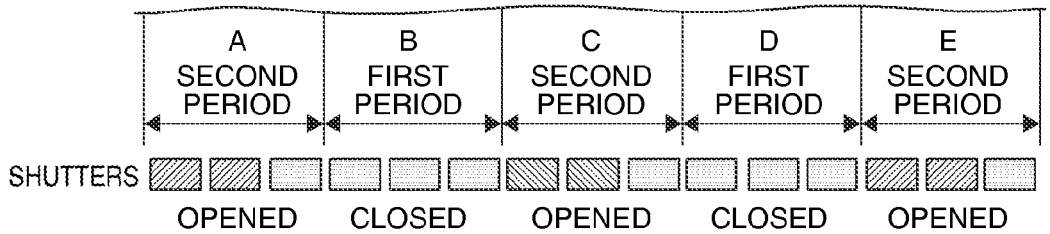
Figure 6C:
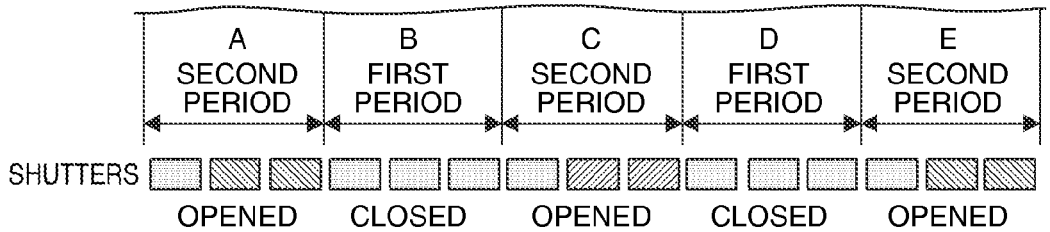

The shutter control unit 103 may control, during the display of the limited content, opening and closing of the right eye shutter and the left eye shutter included in the image viewing glasses 20 to set the center of time of opening during setting of the viewing limitation mode before the center of the second period and open, during non-setting of the viewing limitation mode, in the second period, the shutter for the right eye or the left eye different from the shutter for the right eye or the left eye opened in the first period immediately before the second period. An example shown in FIG. 6A is an example in which the shutters are controlled as explained above. In FIG. 6A, the center of time of opening is set before the center of the second period (e.g., C) and, during non-setting of the viewing limitation mode, in the second period (C), the shutter (the right eye shutter) different from the left eye shutter (see FIG. 4) opened in the first period (B) immediately before the second period (C) is opened.

Figure 6D:
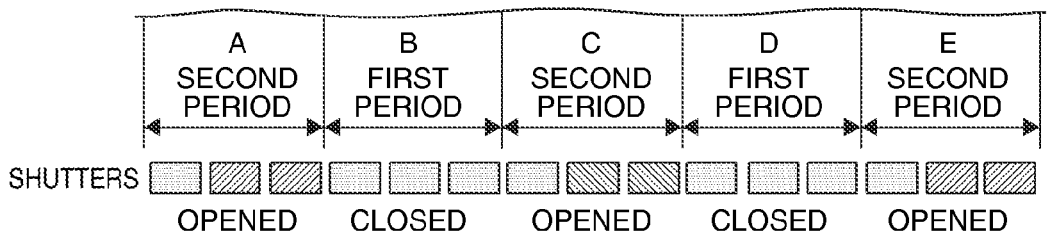

The shutter control unit 103 may control, during the display of the limited image, opening and closing of the right eye shutter and the left eye shutter included in the image viewing glasses 20 to set the center of time of opening during setting of the viewing limitation mode after the center of the second period and, during non-setting of the viewing limitation mode, open, in the second period, one of the shutters for the right eye and the left eye opened in the first period immediately before the second period. An example shown in FIG. 6D is an example in which the shutters are controlled as explained above. In FIG. 6D, the center of time of opening is set after the center of the second period (e.g., C) and, during non-setting of the viewing limitation mode, in the second period (C), the left eye shutter opened in the first period (B) immediately before the second period (C) is opened.

When acquiring the synchronization signal (i.e., the synchronization signal generated by the synchronization-signal generating unit 104) from the limitation-necessity determining unit 105, the communication unit 120 transmits the synchronization signal to the image viewing glasses 20 by radio communication as control information for controlling the image viewing glasses 20. The "radio communication" is communication in which a wire is not used as a transmission line. As the radio communication between the image display apparatus 10 and the image viewing glasses 20, for example, Bluetooth may be used. When acquiring the synchronization signal (i.e., the synchronization signal adjusted by the synchronization-signal adjusting unit 106) from the synchronization-signal adjusting unit 106, the communication unit 120 transmits the synchronization signal to the image viewing glasses 20 by radio communication as the control information.

Image Viewing Glasses 20

The image viewing glasses 20 include a communication unit 220, a shutter driving unit 240, and a shutter unit 250. The shutter unit 250 includes a left eye shutter 250L and a right eye shutter 250R respectively including liquid crystal panels.

The communication unit 220 receives a control signal (the synchronization signal generated by the synchronization-signal generating unit 104 or the synchronization signal adjusted by the synchronization-signal adjusting unit 106) from the image display apparatus 10 by radio communication. More specifically, during the display of the unlimited content, the communication unit 220 receives, as the control signal, the synchronization signal generated by the synchronization-signal generating unit 104 (the control signal for controlling the shutter unit 250 as shown in FIG. 4) irrespectively of whether the image viewing glasses 20 are set in the viewing limitation mode. During the display of the limited content, when the image viewing glasses 20 are set in the viewing limitation mode, the communication unit 220 receives, as the control signal, the synchronization signal adjusted by the synchronization-signal adjusting unit 106 (the synchronization signal for controlling the shutter unit 250 as shown in FIGS. 5A and 5B and 6A to 6D). The communication unit 220 outputs the control signal to the shutter driving unit 240.

The shutter driving unit 240 drives the shutter unit 250 on the basis of the synchronization signal acquired from the communication unit 220. Specifically, the shutter driving unit 240 analyzes the synchronization signal using protocol information stored in a protocol storing unit (not shown in the figures), generates, on the basis of an analysis result of the synchronization signal, a shutter driving signal for driving the shutter unit 250 (a signal for controlling the transmittance of a liquid crystal panel of the left eye shutter 250L and the transmittance of a liquid crystal panel of the right eye shutter 250R), and outputs the generated shutter driving signal to the shutter unit 250.

The shutter unit 250 alternately drives the left eye shutter 250L and the right eye shutter 250R according to the shutter driving signal acquired from the shutter driving unit 240. That is, the left eye shutter 250L and the right eye shutter 250R of the shutter unit 250 open and close on the basis of the control signal output from the image display apparatus 10 (see FIGS. 4, 5A and 5B, and 6A to 6D).

Figure 7:
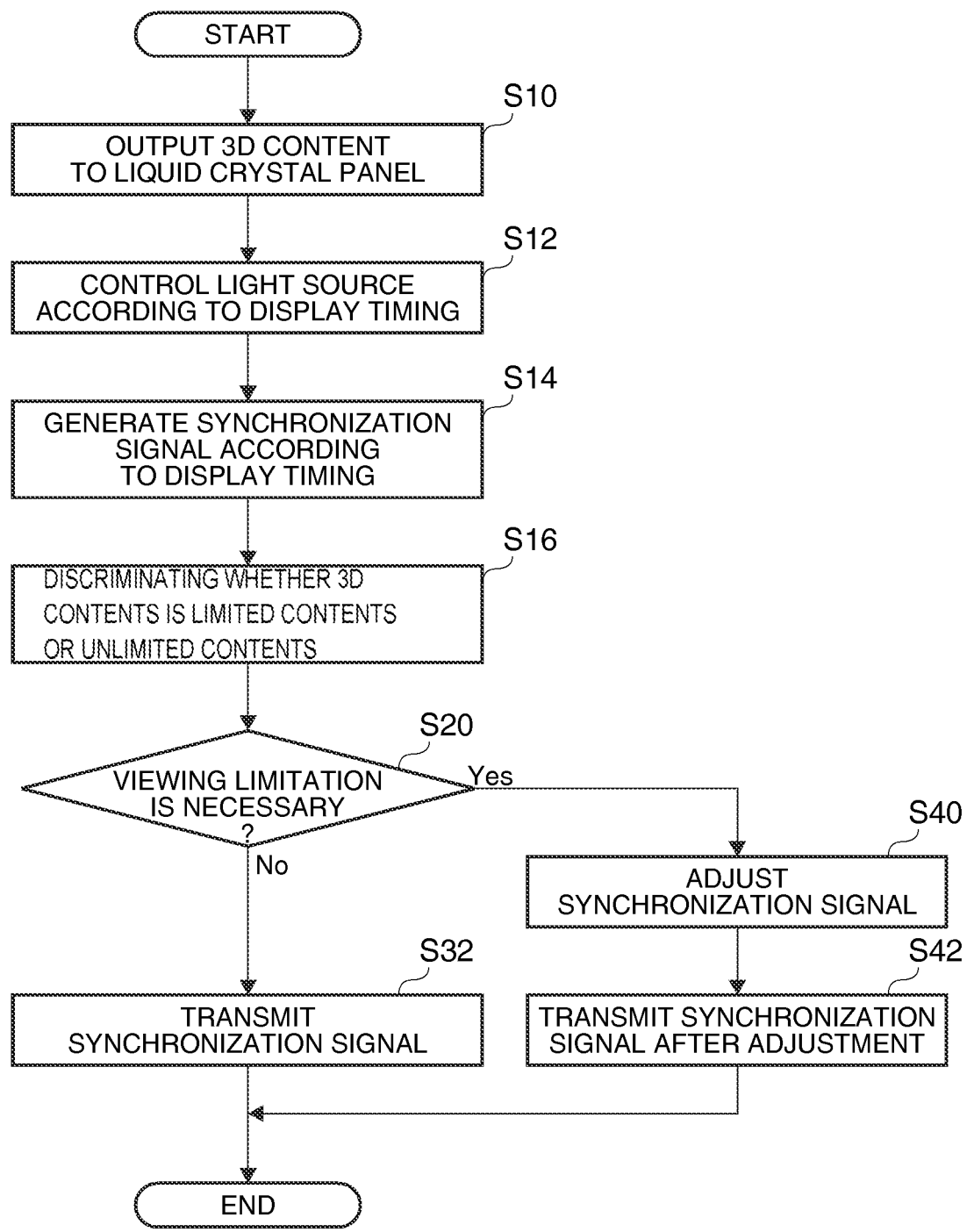
FIG. 7 is a flowchart for explaining an example of the operation of the image display apparatus according to the first embodiment of the invention.

The operation of the image display apparatus 10 is explained below with reference to FIG. 7. FIG. 7 is a flowchart for explaining an example of the operation of the image display apparatus 10 according to the first embodiment of the invention. The flowchart of FIG. 7 starts according to acquisition of 3D content and display timing for the 3D content. It is assumed that, at the start of the flowchart of FIG. 7, the viewing limitation mode presence or absence information shown in FIG. 3 is stored in the mode storing unit 190. It is assumed that a user A (an adult) wears the image viewing glasses 20 having the glasses identification information "G001", a user B (a child) wears the image viewing glasses 20 having the glasses identification information "G002", and the users A and B view the 3D content displayed by the image display apparatus 10.

In FIG. 7, the image control unit 101, which acquires the 3D content and the display timing, outputs the 3D content to the liquid crystal panel 111 according to the display timing (step S10). The image control unit 101 outputs the display timing to the light-source control unit 102 and the synchronization-signal generating unit 104. The light-source control unit 102 controls the light source 112 according to the display timing acquired from the image control unit 101 (step S12).

The synchronization-signal generating unit 104 generates a synchronization signal according to the display timing acquired from the image control unit 101 (step S14). The synchronization-signal generating unit 104 outputs the generated synchronization signal to the limitation-necessity determining unit 105.

The content discriminating unit 109 discriminates whether the 3D content supplied from the image control unit 101 to the liquid crystal panel 111 (i.e., the 3D content displayed on the image display unit 110) is limited content or unlimited content (step S16). The content discriminating unit 109 outputs a discrimination result to the limitation-necessity determining unit 105.

The limitation-necessity determining unit 105 determines, on the basis of a discrimination result by the content discriminating unit 109 and the viewing limitation mode setting presence or absence information stored in the mode storing unit 190, necessity of viewing limitation in the image viewing glasses 20 of the user A and the image viewing glasses 20 of the user B against the 3D content supplied from the image control unit 101 to the liquid crystal panel 111 (i.e., the 3D content displayed on the image display unit 110) (step S20).

When determining that the viewing limitation is unnecessary for certain image viewing glasses 20 (No in step S20), the limitation-necessity determining unit 105 outputs the synchronization signal acquired from the synchronization-signal generating unit 104 to the communication unit 120. The communication unit 120 transmits the synchronization signal (the synchronization signal originally generated by the synchronization-signal generating unit 104) to the image viewing glasses 20 as control information (step S32). The flowchart of FIG. 7 ends.

According to FIG. 3, the image viewing glasses 20 of the user A (the adult) (the image viewing glasses 20 having the glasses identification information "G001") are not set in the viewing limitation mode. Therefore, the limitation-necessity determining unit 105 determines that the viewing limitation is unnecessary irrespective of the discrimination result of the content discriminating unit 109 and outputs the synchronization signal acquired from the synchronization-signal generating unit 104 to the communication unit 120. The communication unit 120 transmits the synchronization signal to the image viewing glasses 20 of the user A as control information.

When determining that the viewing limitation is necessary for the certain image viewing glasses 20 (Yes in step S20), the limitation-necessity determining unit 105 outputs the synchronization signal acquired from the synchronization-signal generating unit 104 to the synchronization-signal adjusting unit 106. The synchronization-signal adjusting unit 106 adjusts the synchronization signal acquired from the limitation-necessity determining unit 105 (step S40). The synchronization-signal adjusting unit 106 outputs the adjusted synchronization signal to the communication unit 120. The communication unit 120 transmits the synchronization signal (the synchronization signal after the adjustment) to the image viewing glasses 20 as control information (step S42). The flowchart of FIG. 7 ends.

According to FIG. 3, the image-viewing glasses 20 for the user B (the child) (the image viewing glasses 20 having the glasses identification information "G002") are set in the viewing limitation mode. Therefore, when acquiring the discrimination result indicating that the 3D content is the limited content from the content discriminating unit 109, the limitation-necessity determining unit 105 determines that the viewing limitation is necessary. The synchronization-signal adjusting unit 106 adjusts the synchronization signal acquired from the limitation-necessity determining unit 105. The communication unit 120 transmits the synchronization signal after the adjustment to the image viewing glasses 20 of the user B as control information. When receiving the discrimination result indicating that the 3D content is the unlimited content from the content discriminating unit 109, the limitation-necessity determining unit 105 determines that the viewing limitation is unnecessary. Therefore, the communication unit 120 transmits the synchronization signal originally generated by the synchronization-signal generating unit 104 to the image viewing glasses 20 of the user B as control information.

As explained above, with the image display apparatus 10 of the image display system 1 according to the first embodiment, it is possible to realize convenient parental control for allowing an adult and a child to simultaneously enjoy content. Specifically, as a preparatory stage, the viewing limitation mode of the image viewing glasses 20 used by the child is set to ON and the viewing limitation mode of the image viewing glasses 20 used by the adult is set to OFF. The image display apparatus transmits, during the display of the limited content, control information to the image viewing glasses 20 for the child, the viewing limitation mode of which is set to ON, to close the image viewing glasses 20 in the first period (a lighting period of the light source (e.g., a backlight) or a period in which the light source is intense and open the image viewing glasses 20 in the second period (an extinguished period of the light source or a period in which the light source is faint). Therefore, it is difficult for the child wearing the image viewing glasses 20 for the child to view the displayed limited image (entire content/scenes in the content). When the child removes the image viewing glasses 20, viewing is made difficult by crosstalk.

When displaying the limited content, the image display unit 110 may display an image indicating that the limited content is displayed. For example, the image display unit 110 may display "limited content in display". Specifically, the content discriminating unit 109 only has to output the discrimination result. When receiving the discrimination result indicating that the 3D content is the limited content from the content discriminating unit 109, the image control unit 101 only has to output a message "limited content in display" to the liquid crystal panel 111.

Instead of or in addition to the above, the image display unit 110 may display the limited content and, when the synchronization signal after the adjustment is output to the image viewing glasses 20, display an image indicating that the image viewing glasses 20 are subjected to the viewing limitation. For example, the image display unit may display "viewing limited". Specifically, the limitation-necessity determining unit 105 only has to output a determination result concerning necessity of the viewing limitation to the image control unit 101. When acquiring a determination result indicating that the viewing limitation is necessary from the limitation-necessity determining unit 105, the image control unit 101 only has to output a message "viewing limited" to the liquid crystal panel 111.

When a continuous display time of the limited content exceeds a predetermined time, the shutter control unit 103 may control opening and closing of the right eye shutter 250R and the left eye shutter 250L included in the image viewing glasses 20 to close, in the second period as well, the image viewing glasses 20 set in the viewing limitation mode.

In the case explained above, the image display unit 110 may display an image indicating that the continuous display time of the limited content exceeds the predetermined time.

The shutter control unit 103 may control, during the display of the limited content, when emergency information is displayed, opening and closing of the right eye shutter 250R and the left eye shutter 250L included in the image viewing glasses 20 to open, in the first period, even the image viewing glasses 20 set in the viewing limitation mode and close the image viewing glasses 20 in the second period as shown in FIG. 4.

Second Embodiment

Figure 8:
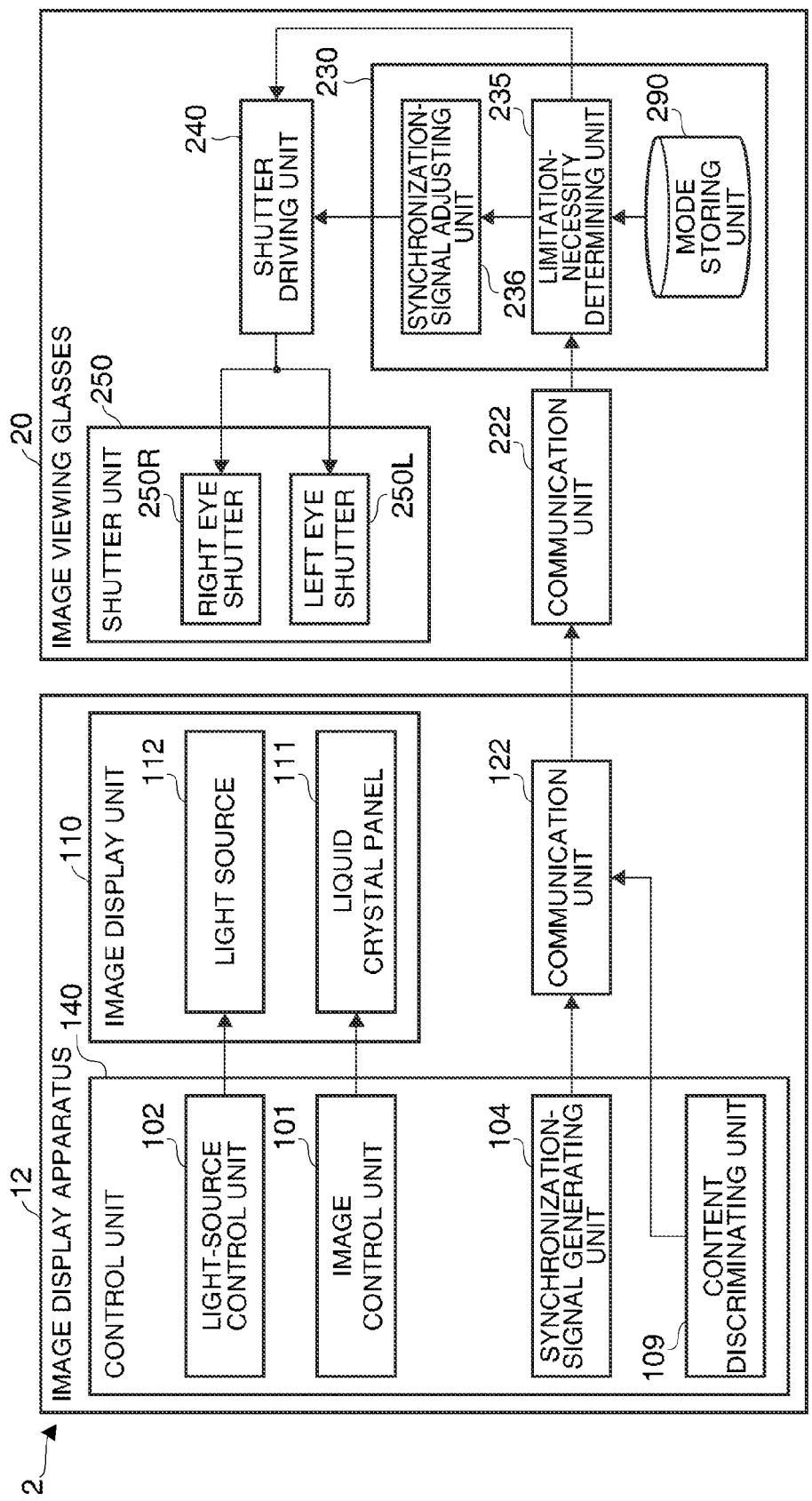
FIG. 8 is an example of a functional block diagram of an image display system including image viewing glasses according to a second embodiment of the invention.

A second embodiment of the invention is explained in detail with reference to the drawings. FIG. 8 is an example of a functional block diagram of an image display system 2 including image viewing glasses according to the second embodiment of the invention.

The image display system 2 includes, as shown in FIG. 8, an image display apparatus 12 configured to display 3D content including an image for the left eye and an image for the right eye and image viewing glasses 22 for viewing the 3D content displayed by the image display apparatus 12. For example, a 3D television or a projector corresponds to the image display apparatus 12. One pair of image viewing glasses 22 is shown in FIG. 8. However, the image display system 2 may include a plurality of pairs of image viewing glasses 22.

Image Display Apparatus 12

The image display apparatus 12 includes a control unit 140 (a CPU), the image display unit 110, and the communication unit 120. The control unit 140 includes the image control unit 101, the light-source control unit 102, the synchronization-signal generating unit 104, and the content discriminating unit 109. The image display unit 110 includes the liquid crystal panel 111 and the light source 112. The image control unit 101, the light-source control unit 102, the synchronization-signal generating unit 104, the content discriminating unit 109, the liquid crystal panel 111, and the light source 112 included in the image display apparatus 12 are the same as the image control unit 101, the light-source control unit 102, the synchronization-signal generating unit 104, the content discriminating unit 109, the liquid crystal panel 111, and the light source 112 included in the image display apparatus 10 of the image display system 1. Therefore, a part or all of explanation thereof is omitted.

The content discriminating unit 109 discriminates whether 3D content supplied from the image control unit 101 to the liquid crystal panel 111 is limited content or unlimited content and outputs a discrimination result to the communication unit 122.

The synchronization-signal generating unit 104 acquires display timing from the image control unit 101. The synchronization-signal generating unit 104 generates, according to the display timing acquired from the image control unit 101, a synchronization signal (see FIG. 4) transmitted to the image viewing glasses 22 and outputs the generated synchronization signal to the communication unit 122.

The communication unit 122 acquires the synchronization signal from the synchronization-signal generating unit 104 and acquires the discrimination result from the content discriminating unit 109. The communication unit 122 transmits the synchronization signal acquired from the synchronization-signal generating unit 104 to the image viewing glasses 22 (for example, by infrared ray or Bluetooth) as control information for controlling the image viewing glasses 22. The communication unit 122 transmits the discrimination result acquired from the content discriminating unit 109 to the image viewing glasses 22 by radio communication. The communication unit 122 may transmit a discrimination result indicating that the 3D content is the limited content to the image viewing glasses 22 and may not transmit a discrimination result indicating that the 3D content is the unlimited content to the image viewing glasses 22.

Image Viewing Glasses 22

The image viewing glasses 22 include a communication unit 222, a shutter control unit 230, the shutter driving unit 240, the shutter unit 250, and a mode storing unit 290. The shutter control unit 230 includes a limitation-necessity determining unit 235 and a synchronization-signal adjusting unit 236. The shutter unit 250 includes a left eye shutter 250L and a right eye shutter 250R respectively including liquid crystal panels. The shutter driving unit 240 and the shutter unit 250 included in the image viewing glasses 22 are the same as the shutter driving unit 240 and the shutter unit 250 included in the image viewing glasses 20 of the image display system 1. Therefore, a part or all of explanation thereof is omitted.

Figure 9A:
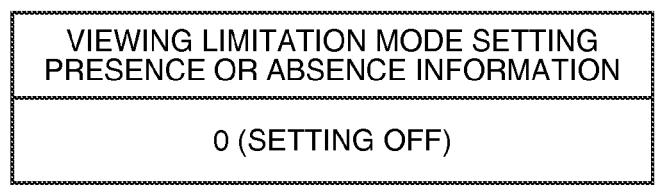
FIGS. 9A and 9B are examples of information stored in a mode storing unit.
Figure 9B:
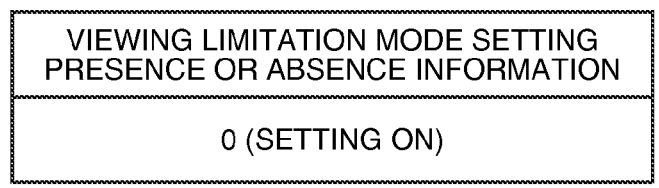

FIGS. 9A and 9B are examples of information stored in the mode storing unit 290. The mode storing unit 290 stores a mode set in the image viewing glasses 22. Specifically, the mode storing unit 290 stores viewing limitation mode setting presence or absence information. For example, the mode storing unit 290 stores viewing limitation mode setting presence or absence information "0 (setting off)" indicating that the image viewing glasses 22 are not set in the viewing limitation mode as shown in FIG. 9A or stores viewing limitation mode setting presence or absence information "1 (setting on)" indicating that the image viewing glasses 22 are already set in the viewing limitation mode as shown in FIG. 9B. An initial value of the viewing limitation mode setting presence or absence information may be set to 0.

The viewing limitation mode setting presence or absence information stored in the mode storing unit 290 may be input in the image viewing glasses 22. That is, a user may input, on the image viewing glasses 22, the viewing limitation mode setting presence or absence information of the image viewing glasses 22.

In the image viewing glasses 22, master glasses and slave glasses may be present. The viewing limitation mode setting presence or absence information of the slave glasses may be input in the master glasses and transmitted from the master glasses (using Bluetooth). The viewing limitation mode setting presence or absence information of the slave glasses may be realized by permitting an input of the viewing limitation mode setting presence or absence information in the master glasses and prohibiting an input of the viewing limitation mode setting presence or absence information in the slave glasses or may be realized by, in the image display apparatus 12, storing the viewing limitation mode setting presence or absence information transmitted from the master glasses in the mode storing unit 290 and discarding the viewing limitation mode setting presence or absence information transmitted from the slave glasses.

The communication unit 222 receives a control signal (the synchronization signal generated by the synchronization-signal generating unit 104) from the image display apparatus 12 by radio communication. The communication unit 222 receives the determination result from the image display apparatus 12 by radio communication. The communication unit 220 outputs the control signal and the discrimination result to the shutter control unit 230 (the limitation-necessity determining unit 235).

During setting of the viewing limitation mode, when receiving the discrimination result indicating that the 3D content is the limited content from the communication unit 222, the shutter control unit 230 adjusts the control information (the synchronization signal) acquired from the communication unit 222 and controls opening and closing of the left eye shutter 250L and the right eye shutter 250R to make it difficult to see the 3D content. Details of the shutter control unit 230 are explained below.

The limitation-necessity determining unit 235 acquires the control signal (the synchronization signal) and the discrimination result from the communication unit 222. When acquiring the control signal and the discrimination result, the limitation-necessity determining unit 235 determines, on the basis of the acquired discrimination result and the viewing limitation mode setting presence or absence information stored in the mode storing unit 290, necessity of the viewing limitation for the 3D content displayed on the image display apparatus 12. A determination method by the limitation-necessity determining unit 235 is the same as the determination method by the limitation-necessity determining unit 105 of the image display apparatus 10 of the image display system 1.

When determining that the viewing limitation is unnecessary, the limitation-necessity determining unit 235 outputs the control information (the synchronization signal) acquired from the communication unit 222 to the shutter driving unit 240. When determining that the viewing limitation is necessary, the limitation-necessity determining unit 235 outputs the control information (the synchronization signal) acquired from the communication unit 222 to the synchronization-signal adjusting unit 236.

When the limitation-necessity determining unit 235 determines that the viewing limitation is necessary, the synchronization-signal adjusting unit 236 acquires the control information (the synchronization signal) from the limitation-necessity determining unit 235. When acquiring the control information (the synchronization signal) from the limitation-necessity determining unit 235, the synchronization-signal adjusting unit 236 adjusts (corrects) the synchronization signal. The synchronization-signal adjusting unit 236 outputs the control information after the adjustment to the shutter driving unit 240.

The adjusting (correcting) of the synchronization signal only has to be adjusting an original signal as a result. For example, the adjusting (correcting) may be simply correcting the original signal (including simply correcting timing) or may be generating a new signal using the original signal.

An adjusting method by the synchronization-signal adjusting unit 236 is the same as the adjusting method by the synchronization-signal adjusting unit 106 included in the image display apparatus 10 of the image display system 1. That is, the synchronization-signal adjusting unit 236 adjusts the synchronization signal to close the left eye shutter 250L and the right eye shutter 250R in the first period and open the shutters in the second period (see FIGS. 5A and 5B and 6A to 6D).

The shutter driving unit 240 acquires the control signal from the limitation-necessity determining unit 235 or the synchronization-signal adjusting unit 236. When acquiring the control signal (i.e., the synchronization signal generated by the synchronization-signal generating unit 104) from the limitation-necessity determining unit 235, the shutter driving unit 240 drives the shutter unit 250 (opens and closes the left eye shutter 250L and the right eye shutter 250R) on the basis of the synchronization signal. When acquiring the control signal (i.e., the synchronization signal adjusted by the synchronization-signal adjusting unit 236) from the synchronization-signal adjusting unit 236, the shutter driving unit 240 drives the shutter unit 250 on the basis of the synchronization signal.

That is, during setting of the viewing limitation mode, when the limited content is displayed, the shutter control unit 230 adjusts the control signal output to the shutter driving unit 240 and controls the shutter unit 250 (i.e., opening and closing of the left eye shutter 250L and the right eye shutter 250R) to close the shutter unit 250 in the first period and open the shutter unit 250 in the second period.

For example, the shutter control unit 230 controls the shutter unit 250 to set the center of a period of opening of the shutters indicated by the synchronization signal generated by the synchronization-signal generating unit 104 in the center of a period of closing of the shutters after the adjustment and set the center of a period of closing of the shutters indicated by the synchronization signal in the center of a period of opening of the shutters after the adjustment. Alternatively, more simply, the shutter control unit 230 may control the shutter unit 250 to set the period of opening of the shutters indicated by the synchronization signal generated by the synchronization-signal generating unit 104 in the period of closing of the shutters after the adjustment and set the period of closing of the shutters indicated by the synchronization signal in the period of opening of the shutters after the adjustment.

The shutter control unit 230 may control the shutter unit 250 to set time of opening of the shutters after the adjustment shorter than time of opening of the shutters indicated by the synchronization signal generated by the synchronization-signal generating unit 104 as shown in FIG. 6A, 6B, 6C, or 6D.

Figure 10:
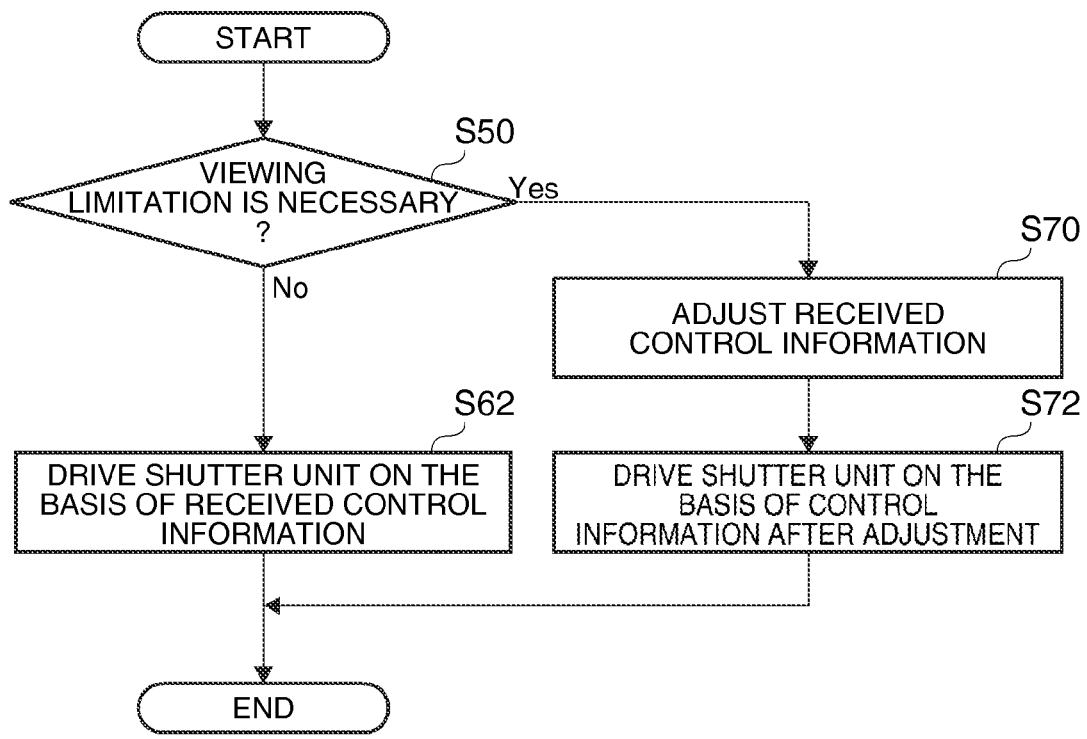
FIG. 10 is a flowchart for explaining an example of the operation of the image viewing glasses according to the second embodiment of the invention.

The operation of the image viewing glasses 22 is explained below with reference to FIG. 10. FIG. 10 is a flowchart for explaining an example of the operation of the image viewing glasses 22 according to the second embodiment of the invention. The flowchart of FIG. 10 starts according to reception of the control signal (the synchronization signal) and the discrimination result.

In FIG. 10, the communication unit 222, which receives the control signal and the discrimination result, outputs the control signal (the synchronization signal) and the discrimination result to the limitation-necessity determining unit 235.

The limitation-necessity determining unit 235 determines, on the basis of the discrimination result acquired from the communication unit 222 and the viewing limitation mode setting presence or absence information stored in the mode storing unit 290, necessity of the viewing limitation against the 3D content displayed on the image display apparatus 12 (step S50).

When determining that the viewing limitation is unnecessary (No in step S50), the limitation-necessity determining unit 235 outputs the control information (the synchronization signal) acquired from the communication unit 222 to the shutter driving unit 240. The shutter driving unit 240 drives the shutter unit 250 (opens and closes the left eye shutter 250L and the right eye shutter 250R) on the basis of the control signal (the synchronization signal originally generated by the image display apparatus 12) (step S62). The flowchart of FIG. 10 ends.

For example, when the image viewing glasses 22 are worn by the user A (the adult) and the viewing limitation mode presence or absence information shown in FIG. 9A is stored in the mode storing unit 290, the limitation-necessity determining unit 235 determines the viewing limitation is unnecessary irrespective of the discrimination result (No in step S50) and drives the shutter unit 250 on the basis of the received control information (the synchronization signal originally generated by the image display apparatus 12) (step S62).

When determining that the viewing limitation is necessary (Yes in step S50), the limitation-necessity determining unit 235 outputs the control information (the synchronization signal) acquired from the communication unit 222 to the synchronization-signal adjusting unit 236. The synchronization-signal adjusting unit 236, which acquires the control information (the synchronization signal) from the limitation-necessity determining unit 235, adjusts the synchronization signal (step S70). The synchronization-signal adjusting unit 236 outputs the control information after the adjustment to the shutter driving unit 240. The shutter driving unit 240 drives the shutter unit 250 (opens and closes the left eye shutter 250L and the right eye shutter 250R) on the basis of the control signal (the synchronization signal adjusted by the synchronization-signal adjusting unit 236) (step S72). The flowchart of FIG. 10 ends.

For example, when the image viewing glasses 22 is worn by the user B (the child) and the viewing limitation mode presence or absence information shown in FIG. 9B is stored in the mode storing unit 290, when receiving the discrimination result indicating that the 3D content is the limited content, the limitation-necessity determining unit 235 determines that the viewing limitation is necessary (Yes in step S50), adjusts the received control information (the synchronization signal generated by the image display apparatus 12) (step S70), and drives the shutter unit 250 on the basis of the control information after the adjustment (step S72).

As explained above, with the image viewing glasses 22 of the image display system 2 according to the second embodiment, it is possible to obtain the same effect as the effect of the image display apparatus 10 of the image display system 1 according to the first embodiment. In the image display system 1, the viewing limitation for the 3D content is realized by the image display apparatus 10. In the image display system 2, the viewing limitation for the 3D content is realized by the image viewing glasses 22. In the case of the image display system 1, the image display apparatus 10 transmits different control signals to the respective pairs of image viewing glasses 20 according to necessity of the viewing limitation and the image viewing glasses 20 open and close the shutters according to the control signals transmitted from the image display apparatus 10. In the case of the image display system 2, the image display apparatus 12 transmits the same control signal to all the pairs of image viewing glasses 22 and the respective pairs of image viewing glasses 22 adjust the control signals transmitted from the image display apparatus 12 according to necessity of the viewing limitation and open and close the shutters.

Third Embodiment

Figure 11:
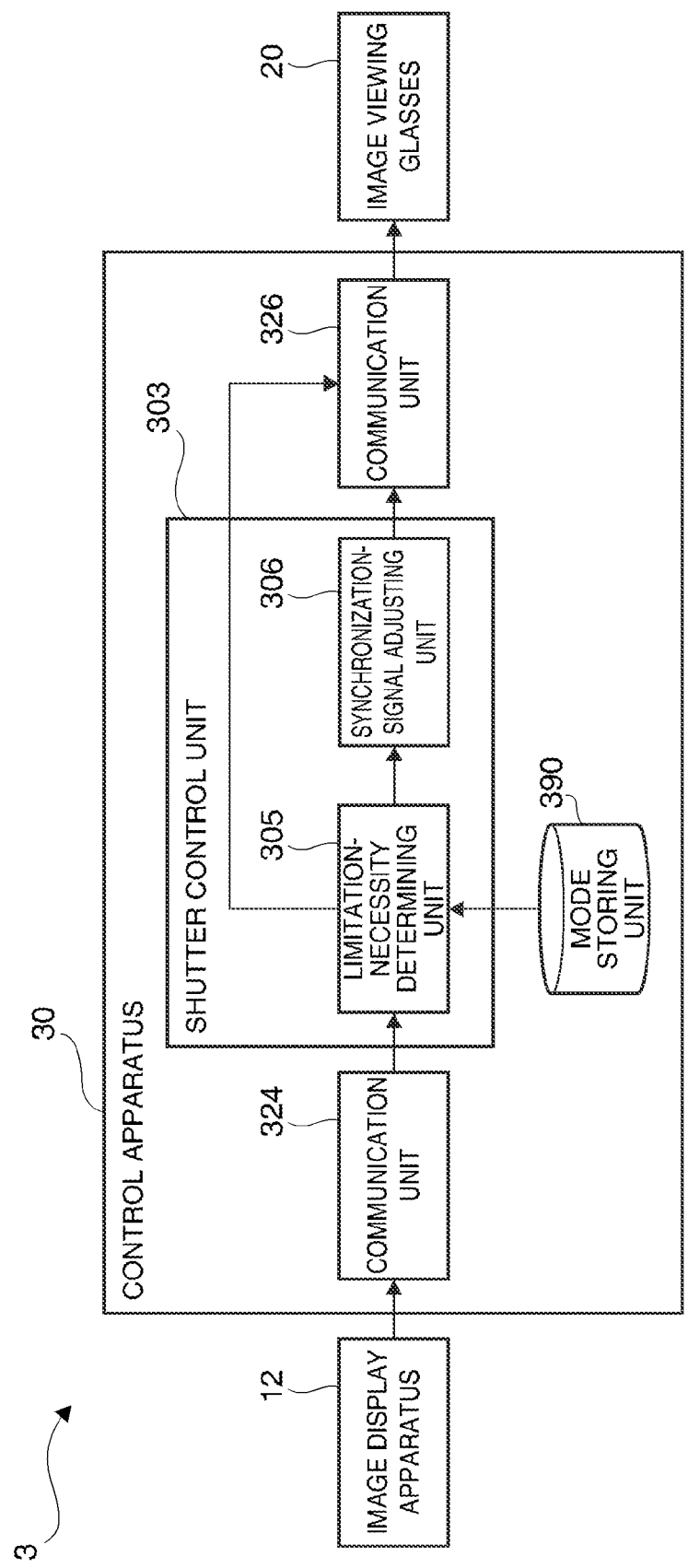
FIG. 11 is an example of a functional block diagram of an image display system including a control apparatus according to a third embodiment of the invention.

A third embodiment of the invention is explained in detail with reference to the drawings. FIG. 11 is an example of a functional block diagram of an image display system 3 including a control apparatus 30 according to the third embodiment of the invention.

The image display system 3 includes, as shown in FIG. 11, the image display apparatus 12 of the image display system 2 (see FIG. 8), the control apparatus 30, and the image viewing glasses 20 of the image display system 1 (see FIG. 1). In FIG. 11, one pair of image viewing glasses 20 is shown. However, the image display system 3 may include a plurality of pairs of image viewing glasses 20.

Control Apparatus 30

The control apparatus 30 includes communication units 324 and 326, a shutter control unit 303, and a mode storing unit 390. The shutter control unit 303 includes a limitation-necessity determining unit 305 and a synchronization-signal adjusting unit 306.

Like the mode storing unit 190 of the image display apparatus 10 of the image display system 1, the mode storing unit 390 stores a mode (viewing limitation mode setting presence or absence information) set in the image viewing glasses 20. As in the first embodiment, in the third embodiment, in the image viewing glasses 20, master glasses and slave glasses may be present. When the master glasses and the slave glasses are present, the mode storing unit 390 of the control apparatus 30 stores viewing limitation mode setting presence or absence information of the master glasses and the slave glasses transmitted from the master glasses.

Like the communication unit 222 of the image viewing glasses 22 of the image display system 2, the communication unit 324 receives a control signal (a synchronization signal generated by the synchronization-signal generating unit 104) and a discrimination result from the image display apparatus 12. The communication unit 324 outputs the control signal and the discrimination result to the shutter control unit 303 (the limitation-necessity determining unit 305).

The limitation-necessity determining unit 305 determines, on the basis of the discrimination result acquired from the communication unit 324 and the viewing limitation mode setting presence or absence information stored in the mode storing unit 390, necessity of viewing limitation against 3D content displayed on the image display apparatus 12. A determination method by the limitation-necessity determining unit 305 is the same as the determination method by the limitation-necessity determining unit 105 of the image display apparatus 10 of the image display system 1.

When determining that the viewing limitation is unnecessary, the limitation-necessity determining unit 305 outputs the control signal (the synchronization signal) acquired from the communication unit 324 to the communication unit 326. When determining that the viewing limitation is necessary, the limitation-necessity determining unit 305 outputs the control signal (the synchronization signal) acquired from the communication unit 324 to the synchronization-signal adjusting unit 306.

When the limitation-necessity determining unit 305 determines that the viewing limitation is necessary, the synchronization-signal adjusting unit 306 acquires the control signal (the synchronization signal) from the limitation-necessity determining unit 305. When receiving the synchronization signal from the limitation-necessity determining unit 305, the synchronization-signal adjusting unit 306 adjusts (corrects) the synchronization signal. The adjusting (correcting) the synchronization signal only has to be adjusting an original signal as a result. For example, the adjusting (correcting) may be simply correcting the original signal (including simply correcting timing) or may be generating a new signal using the original signal.

An adjusting method for the synchronization signal by the synchronization-signal adjusting unit 306 is the same as the adjusting method by the synchronization-signal adjusting unit 106 of the image display apparatus 10 of the image display system 1. That is, when the image display apparatus 12 displays 3D content requiring the viewing limitation, the synchronization-signal adjusting unit 306 adjusts, targeting the image viewing glasses 20 set in the viewing limitation mode for limiting viewing of the 3D content requiring the viewing limitation, the synchronization signal to close the image viewing glasses 20 in the first period and open the image viewing glasses 20 in the second period. The synchronization-signal adjusting unit 306 outputs the adjusted synchronization signal to the communication unit 326.

When acquiring the control signal (i.e., the synchronization signal generated by the synchronization-signal generating unit 104) from the limitation-necessity determining unit 305, the communication unit 326 transmits the control signal to the image viewing glasses 20 by radio communication (e.g., Bluetooth). When acquiring the control signal (i.e., the synchronization signal adjusted by the synchronization-signal adjusting unit 306) from the synchronization-signal adjusting unit 306, the communication unit 326 transmits the control signal to the image viewing glasses 20 by radio communication.

As explained above, with the control apparatus 30 of the image display system 3 according to the third embodiment, it is possible to obtain an effect same as the effect of the image display apparatus 10 of the image display system 1 according to the first embodiment and the image viewing glasses 22 of the image display system 2 according to the second embodiment.

In the image display system. 3, the control apparatus 30 may include the content discriminating unit 109 instead of the image display apparatus 12.

In the embodiments of the invention, the shutter control unit may control, during the display of the limited image, opening and closing of the shutters to set time of opening of during setting of the viewing limitation mode shorter than time of closing during the setting of the viewing limitation mode. That is, the shutter control unit may control the times of opening and the time of closing during the setting of the viewing limitation mode to make it more difficult for the child to view the limited content.

In the embodiments of the invention, as the example of the method of making it difficult to view the limited image being displayed, the method of controlling the shutter device to close the shutter device in the first period (the lighting period of the light source (e.g., a backlight) or the period in which the light source is intense) and open the shutter device in the second period (the extinguished period of the light source or the period in which the light source is faint) is explained. However, the method of making it difficult to view the limited image being displayed is not limited to this. For example, if the image display apparatus includes a plurality of light sources that respectively illuminate different regions, the lighting period or the light emission intensity may be controlled for at least one of the plurality of light sources and the shutter device may be controlled according to the control of the lighting period or the light emission intensity to make it difficult to view the limited image. When such a control is performed, average visibility of the entire screen falls as in the method explained above. Therefore, it is possible to make it difficult to view the limited image.

A program for executing the processing of the image display apparatus 10, the image viewing glasses 22, or the control apparatus 30 according to the embodiments of the invention may be recorded in a computer-readable recording medium. The processing of the image display apparatus 10, the image viewing glasses 22, or the control apparatus 30 may be realized by causing a computer system to read the program recorded in the recording medium and execute the program. The "computer system" may include an OS and hardware such as peripheral apparatuses. If a WWW system is used, the "computer system" includes a webpage providing environment (or display environment). The "computer-readable recording medium" means a writable nonvolatile memory such as a flexible disk, a magneto-optical disk, a ROM, or a flash memory, a portable medium such as a CD-ROM, or a storage device such as a hard disk installed in the computer system.

Further, the "computer-readable recording medium" includes a recording medium that retains a program for a fixed time such as a volatile memory (e.g., a DRAM (Dynamic Random Access Memory)) in a computer system that function as a server or a client when the program is transmitted via a network such as the Internet or a communication line such as a telephone line. The program may be transmitted from a computer system in which the program is stored in a storage device or the like to another computer system via a transmission medium or by a transmission wave in the transmission medium. The "transmission medium" for transmitting the program means a medium having a function of transmitting information like a network (a communication network) such as the Internet or a telecommunication line (a communication line) such as a telephone line. The program may be a program for realizing a part of the functions explained above. Further, the program may be a program that can realize the functions in combination with a program already recorded in the computer system, a so-called difference file (a difference program).

The embodiments of the invention are explained in detail above. However, a specific configuration is not limited to the embodiments and includes designs and the like without departing from the spirit of the invention.

The display apparatus according to the invention is not limited to the projector that projects an image on a projection surface. The display apparatus according to the invention also includes various display apparatuses such as a liquid crystal monitor or a liquid crystal television that displays an image on a liquid crystal display panel, a monitor apparatus or a television receiver that displays an image on a PDP (plasma display panel), and a self-emitting display apparatus such as a monitor apparatus or a television receiver that displays an image on an organic EL display panel called OLED (Organic Light-emitting-diode), OEL (Organic Electro-Luminescence), or the like. Further, the display apparatus includes a portable display apparatus that can display an image based on an input image signal.

What is claimed is:

1. An image display apparatus that displays an image for a stereoscopic image to be viewed using a shutter device including shutters for a right eye and a left eye, the image display apparatus comprising:

an image display unit configured to display the image;

a light-source control unit configured to control a light source of the image display unit in a first period and a second period;

a content discriminating unit configured to discriminate whether the image displayed on the image display unit is a limited image requiring viewing limitation or an unlimited image not requiring the viewing limitation; and a shutter control unit configured to control the shutter of the shutter device, wherein the light-source control unit controls the light source to reduce light emission in the second period compared with light emission in the first period, and the shutter control unit controls, during the display of the limited image, the shutter device set in a viewing limitation mode for limiting viewing of the limited image, to close the shutter in the first period and open the shutter in the second period.

2. The image display apparatus according to claim 1, wherein the shutter control unit controls, during the display of the limited image and during the display of the unlimited image, the shutter device not set in the viewing limitation mode, to open the shutter in the first period and close the shutter in the second period.

3. The image display apparatus according to claim 1, wherein the shutter control unit controls, during the display of the unlimited image, the shutter device not set in the viewing limitation mode and the shutter device set in the viewing limitation mode, to open the shutter in the first period and close the shutter in the second period.

4. The image display apparatus according to claim 1, wherein the shutter control unit controls, during the display of the limited image, the shutter to open in time including a center of the second period.

5. The image display apparatus according to claim 1, wherein the shutter control unit sets, during the display of the limited image, a center of a period of opening of the shutter during non-setting of the viewing limitation mode in a center of a period of closing of the shutter during setting of the viewing limitation mode, and sets a center of a period of closing of the shutter during the non-setting of the viewing limitation mode in a center of a period of opening of the shutter during the setting of the viewing limitation mode.

6. The image display apparatus according to claim 1, wherein the shutter control unit sets, during the display of the limited image, time of opening during setting of the viewing limitation mode to be shorter than time of opening during non-setting of the viewing limitation mode.

7. The image display apparatus according to claim 1, wherein the shutter control unit sets, during the display of the limited image, time of opening of during setting of the viewing limitation mode to be shorter than time of closing during the setting of the viewing limitation mode.

8. The image display apparatus according to claim 1, wherein the shutter control unit sets, during the display of the limited image, a center of time of opening during setting of the viewing limitation mode before a center of the second period and controls, during non-setting of the viewing limitation mode, in the second period, the shutter for the right eye or the left eye different from the shutter for the right eye or the left eye opened in the first period immediately before the second period to open.

9. The image display apparatus according to claim 1, wherein the shutter control unit sets, during the display of the limited image, a center of time of opening during setting of the viewing limitation mode after a center of the second period and, during non-setting of the viewing limitation mode, controls, in the second period, one of the shutters for the right eye and the left eye opened in the first period immediately before the second period to open.

10. The image display apparatus according to claim 1, wherein the image display unit displays an image indicating that the limited image is displayed.

11. The image display apparatus according to claim 1, wherein the shutter control unit controls, when a continuous display time of the limited image exceeds a predetermined time, the shutter device set in the viewing limitation mode to close the shutter in the second period.

12. The image display apparatus according to claim 11, wherein the image display unit displays an image indicating that the continuous display time of the limited image exceeds a predetermined time.

13. The image display apparatus according to claim 1, wherein the shutter control unit controls, during the display of the limited image, when emergency information is displayed, the shutter device to open the shutter, in the first period, even the shutter device set in the viewing limitation mode, and controls the shutter device to close the shutter in the second period.

14. The image display apparatus according to claim 1, wherein
the shutter devices include a first shutter device and a second shutter device, and
setting of the viewing limitation mode of the second shutter device is performed by the first shutter device.

* * * * *